United States Patent [19]
Abrahams

[11] 3,918,495
[45] Nov. 11, 1975

[54] NOVEL GASKET AND VALVE COMPRISING SAME

[75] Inventor: Louis Abrahams, Worcester, Mass.

[73] Assignee: Waters Associates, Milford, Mass.

[22] Filed: Nov. 14, 1973

[21] Appl. No.: 415,784

[52] U.S. Cl. ............ 137/625.48; 251/331; 251/368
[51] Int. Cl.² .......................................... F16K 7/16
[58] Field of Search ...... 251/331, 61.1, 368, 335 A, 251/205, 208; 137/625.48

[56] References Cited
UNITED STATES PATENTS

| | | | |
|---|---|---|---|
| 1,693,407 | 11/1928 | Shand | 251/335 A X |
| 2,209,956 | 8/1940 | Chase et al. | 251/335 A X |
| 2,812,777 | 11/1957 | Dahl | 251/335 A X |
| 3,269,410 | 8/1966 | Alvarado et al. | 251/331 X |

*Primary Examiner*—Arnold Rosenthal
*Attorney, Agent, or Firm*—Robert A. Cesari; John F. McKenna; Andrew F. Kehoe

[57] ABSTRACT

A plate-like structure comprising a liquid flow path formed in one face thereof, a thin ductile seal-forming coating on the face of the structure which forms the flow path. The structure finds many utilities, most advantageously in constructing a novel valve wherein the disk is flexible and adapted for flexing a central face portion thereof against a conduit, thereby sealing said conduit.

10 Claims, 6 Drawing Figures

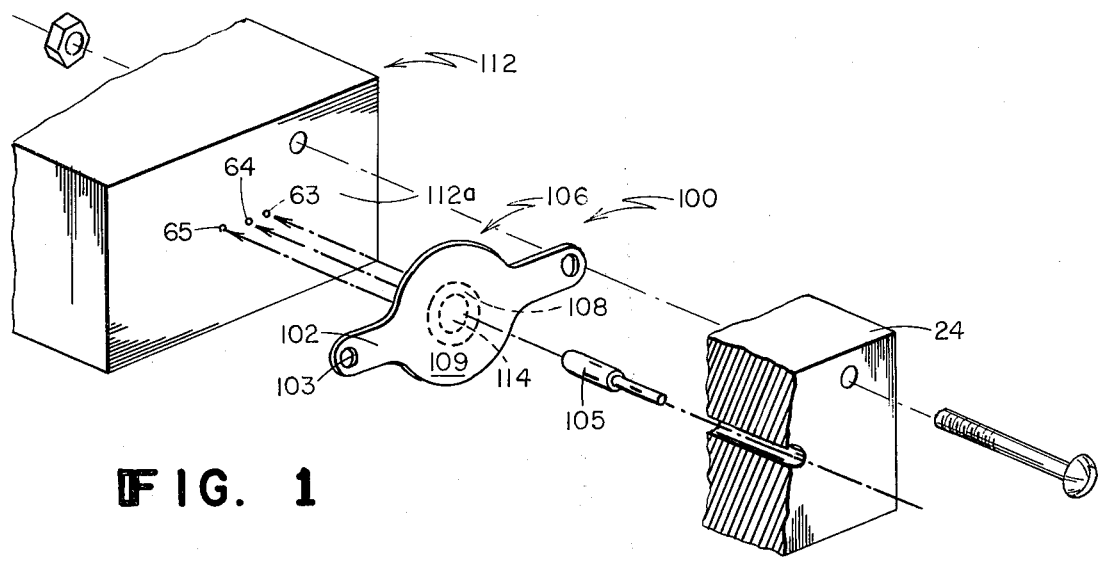
FIG. 1
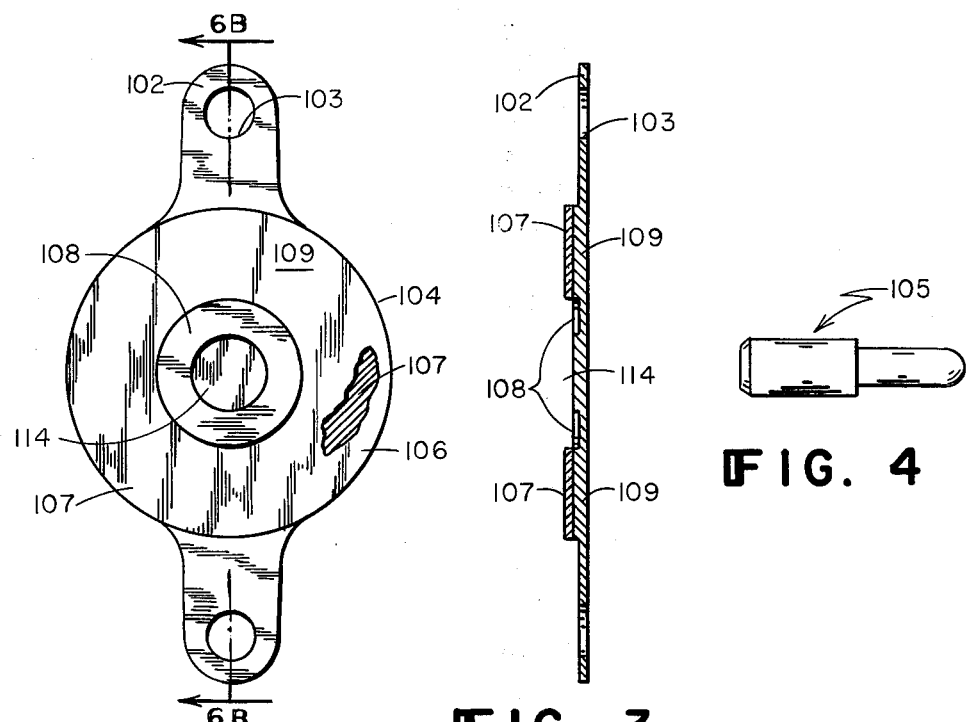
FIG. 2
FIG. 3
FIG. 4

NOVEL GASKET AND VALVE COMPRISING SAME

BACKGROUND OF THE INVENTION

There have long been a number of problems encountered in achieving optimum flow patterns for small quantities of liquids being conducted through flow paths associated with analytical apparatus such as, for example, optically-sensitive apparatus like refractometers, ultraviolet absorbtion apparatus, etc. Such problems are also encountered in very small valves, which are used with liquid analytical apparatus, e.g., liquid chromatography systems.

In general all of these problems relate to obtaining dependable displacement of the small quantity of liquid — often injected into a liquid carrier in microliter or submicroliter quantities — without undue dilution caused by excessively turbulent flow patterns and without undue contamination resulting from a previously utilized liquid, or from leaching elastomeric seals. And, of course, the suitability of the apparatus for use at high pressures without leaking is generally aa prerequisite for such flow paths.

Attempts to provide valves having desired reliability have included the use of relatively rigid plastic materials. (By "relatively rigid" is meant rigid as opposed to elastomeric synthetic polymers of the type used in gaskets at normal pressures.) These rigid materials have been used in making seats or other seal structure for valves used in injector mechanisms. Problems arise in use of such materials, they tend to absorb (and desorb) some of the broad spectrum of chemical compounds, with which they can be expected to contact. This feature not only tends to change their dimensions but also tends to provide a source for contaminants. Some tend to cold flow at high pressures. This becomes a major problem, even with such relatively creep-resistant materials as the polyacetal-type, whenever an attempt is made to incorporate them in tiny valves meant to moderate the flow of batch samples in the microliter range.

The thrust of innovation by others in this area appears to be development of small volume valves that really serve as sample holding devices e.g., slide valve as described in U.S. Pat. No. 3,748,833 to Karas et al, and can be pivoted or pushed from a sample-receiving position to a sample-flushing position. These devices are not particularly advantageous. Many depend upon elastomers for sealing limits; such dependence interferes with the structural stability of the valves because of cold flow and wear.

SUMMARY OF THE INVENTION

Therefore it is an object of the invention to provide an article, for use in forming low volume conduit-defining paths for low volume applications, wherein the article comprises both a flow-defining means and seal means.

Another object of the invention is to provide a flow-defining and seal means which is readily flushible.

Another object of the invention is to provide a novel valve utilizing the flow-defining and seal means of the aforesaid article.

Other objects of the invention will be obvious to those skilled in the art on reading the present invention.

The above objects have been substantially achieved by construction of an article primarily suited for use under compression and which comprises a thin disk having a flow path formed on one face thereof and coated with a ductile sealant of less than about 0.002 inches in thickness, this sealant being on that side of the disk which comprises the flow path.

The disk itself is preferably not over about 0.030 inch in thickness and has an average diameter, or width if it be other than circular, of at least about twenty times the thickness of the metal. This permits compressive stresses applied thereto, to provide some flexibility and thereby facilitate the conformance of the sealant to the surface with which it is to be placed in sealing relationship. Of course, when the disk is used as a diaphragm in a valve the disk must be flexible enough to respond to valve operating means.

The ductile sealant may be formed of a metal such as lead, gold, copper or ductile copper alloys. More advantageously it is formed of synthetic polymeric materials such as polyvinyl chloride, polyethylene and the like. Polyhalocarbons such as polytetrafluoroethylene are the most advantageous materials because they strike an excellent balance between cost, chemical stability such as exemplified by resistance to contaminating fluids with leachable components, and ductibility. It is advantageous to have the polymeric coating about 0.001 inches in thickness, thus while it has the ability to exist as a free-standing film, it has no inherent three-dimensional shape, depending on its adherence to the underlying disk to assume its ring-like structure exhibited in the article of the invention.

The disk itself is preferably formed of stainless steel or some other flexible but non-ductile metal.

The flow path formed in the disk, and taking the sealant coating into account, is desirably no greater than about 0.010 inch in depth and conveniently can be as low as 0.002 inches in depth. Preferably the depth of the flow path is equal to at least twice the thickness of the sealant coat. In apparatus associated with analytical devices such as liquid chromatographs, refractometers, U.V. absorbing devices and the like, the volume of the flow path is advantageously below 0.001 cubic centimeters.

ILLUSTRATIVE EXAMPLE OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions are selected and included for purposes of illustration in order that others skilled in the art will more fully understand the invention and the principles thereof and will be able to modify it in a variety of forms, each as may be best suited in the condition of a particular case.

IN THE DRAWINGS

FIG. 1 is a perspective and exploded view of a novel valve utilizing the flow-defining article of the invention.

FIG. 2 is a plan view of the flow-defining disk.

FIG. 3 is a section through said gasket article.

FIG. 4 is a view of the valve operating rod.

Figure 5:
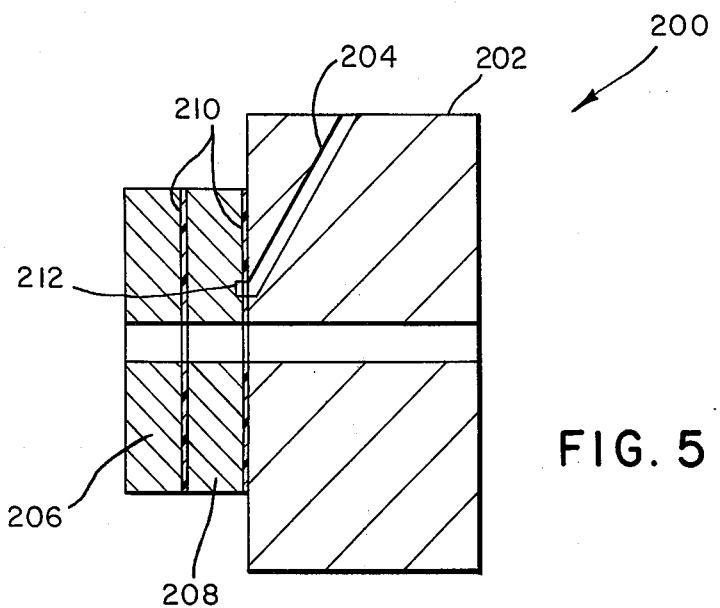
FIG. 5 is a section of a flow cell using a flow-path defining gasket of the invention.

Before describing the valve in detail, the following list of advantageous features is set forth:

a. The valve has substantially no excess volume not serving to augment the flow capacity thereof.

b. The valve has no conventional elastomeric structural members; but it does have a thin, less than about 0.002 inches and advantageously about 0.001 inches thick, coating of a ductile coating, i.e., a lead, gold, copper or polymeric coating like a polytetrafluoroethylene is advantageous because of its chemical inertness; it also has exceptional resistance to excessive feathering at high pressures.

c. There is substantially no deadspace in the valve; by "deadspace" is meant volume wherein liquid can be deposited and resist quick-removal by flushing of the valve. The illustrated valve has no deadspace and only about 0.001 in 3 of volume to be flushed; even this volume can easily be reduced to small fraction of that if required.

d. The valve can be quickly and conveniently moved between open and shut positions by a push-pull mechanism, thereby making it particularly well adapted to automatic control. This push-pull mechanism, thereby making it particularly well adapted to automatic control. This push-pull action is absolutely free of sliding contact between parts within the liquid-containing chamber of the valve.

e. There is little or no valve structure promoting mixing or disturbance of plug-flow of liquid therethrough.

f. The valve provides an effective means to allow the joinder of one fluid with an existing flow path. As such, it serves not only the function of a valve but a valved T-connection in a piping system.

g. The valve can be easily inspected and replaced.

FIG. 1 through 3 illustrate a valve 100 comprising a generally flat, thin, metallic disc 106 with positioning ears 102 apertured at 103 to provide means to position the valve to structure of an assembly. The ears are slightly recessed in the illustrated embodiment: The main body 104 of the valve comprises operating disk 106 of stainless steel, a coating of corrosion-resistant, chemically inert, polymer 107 on the outer annular surface 109 thereof. Disk 106 has in its face a circular groove 108 adapted to form a flow path 110. The valve comprises, on a single face 112a of the housing inlet and outlet conduits necessary for its operation, e.g., 63, 64 and 65.

A valve operating rod 105 is centrally mounted with respect to disk 106 to flex it downwardly into contact with housing 112. When the disk is allowed to flex away from housing 112, liquid may flow into (or out of, as in the present apparatus) the valve structure from a centrally located port 64 which is blocked by central sealing surface 114, when the disk is flexed toward port 64.

The thin stainless steel disk comprises a polytetrafluroethylene coating of about 0.001 inch thick as a sealing means. In fact this disk is at once a gasket and a diaphragm because the coating serves as a seal in high-pressure applications.

When the disk is in its closed position, i.e., with central sealing face 114 pressed against conduit 64 by operating rod 105, liquid can flow through the inlet from conduit port 65 halfway around surface 114, via the conduit formed by peripheral groove 108 and housing member 112a, and the port to conduit 63 which serves as the outlet port of the valve. However, when the disk is allowed to resume its normal and non-flexed position, face 114 is retracted from contact with the port to conduit 64 and liquid entering the valve through port 65 is free to flow through the port to conduit 64 as well as the port to conduit 63.

Figure 6:
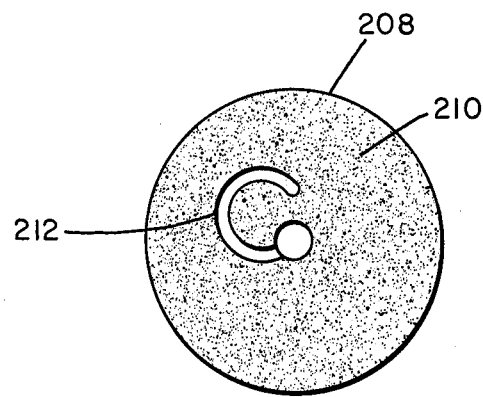
FIG. 6 is a view of the face of the gasket shown in FIG. 5.

Another application for the article of the invention which comprises both flow-path and gasket utility is use in manufacture of a flow cell 200 as seen in FIG. 5 and 6:

Flow cell 200 is of the general type used in ultra-violet light, absorbtion-measuring apparatus, in refractometers and other such devices. In all such flow cells there is a desirability to avoid any light refracting or light-reflecting phenomena because of flow characteristics. Moreover, it is desirable to bring sample flow in from the bottom of such cells to avoid any possible gas entrapment near an elevated entrace port. Finally, it is desirable to be able to build sample cells that can be tailored to any optimum configuration of sample flow path.

Referring to FIG. 5, there is seen a flow cell 200 having a housing 202 with an inlet flow path 204 therein. At the front of the cell is a window 206 and, forming a flow path between window 206 and housing 202, is a flow-path defining gasket 208 with an elastomeric seal coating 210 on at least one side thereof.

FIG. 6 indicates the coating 210 which is again but 0.001 inch of organic polymer like polytetrafluoroethylene. A flow path 212 has been etched into the disk which is about 0.012 inch thick and formed of stainless steel.

In generaly, this self-sealing, flow-path defining gasket comprising a feathering-resistant layer of less than about 0.002 inch of polymer as a seal is highly versatile in that its use makes the implementation of any flow path configuration relatively easy.

It will be noted that the disk member is held in compression between its adjacent members manifold block 112 and also member 24. These, in effect, form the valve housing. Means by which they are held in compression are known in the art; e.g., they can be a simple nuts-and-bolts arrangement. Such means are not shown in detail in the drawings because it is not believed that they, per se, add any novelty to the invention, are not required illustration to explain the invention to any skilled in the art.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

What is claimed is:

1. A diaphragm valve which comprises
   A. A first housing member comprising inlet and outlet conduits therein and ports communicating therewith a diaphragm operating rod;
   B. A second housing member forming means to guide said diaphragm-operating rod;
   C. A thin metallic diaphragm adapted to be held snugly in sealing contact with said first housing member and in compression between both said housing members, said diaphragm comprising a flow channel in the face thereof adapted to be held against said first housing member;
   D. wherein said operating rod forms means to flex said diaphragm and to position a sealing face of said diaphragm snugly against one said port in said first housing member; and E. wherein substantially all fluid volume between said inlet and outlet conduits of said valve, in its closed position, is formed by said flow channel in said diaphragm.

2. Apparatus as defined in claim 1 wherein said diaphragm comprises an annular flow path, forming with said manifold member a channel for circumventing said sealing face, said annular flow path connecting conduits in said manifold member.

3. Apparatus as defined in claim 1 wherein said diaphragm is removeable from said apparatus by the separation of said housing members, said valving member and said valve comprising no additional means for retaining said diaphragm between said housing members.

4. Apparatus as defined in claim 2 wherein said diaphragm is removeable from said apparatus by the separation of said housing members, and said valving member and said valve comprising no additional means for retaining said diaphragm between said housing members.

5. Apparatus as defined in claim 1 wherein said channel has a maximum volume of about 0.001 cubic centimeters.

6. Apparatus as defined in claim 1 wherein said face of said diaphragm in sealing contact with said manifold member comprises a ductile coating of a material selected from a metal or a plastic, said coating positioned around the periphery of said channel and being less than about 0.002 inches in thickness.

7. Apparatus as defined in claim 6 wherein said diaphragm comprises an annular flow path, forming with said manifold member a channel for circumventing said sealing face, said annular flow path connecting conduits in said manifold member.

8. Apparatus as defined in claim 7 wherein said diaphragm is removeable from said apparatus by the separation of said housing members, said valving member and said valve comprising no additional means for retaining said diaphragm between said housing members.

9. Apparatus as defined in claim 6 wherein said coating is a synthetic polymer.

10. Apparatus as defined in claim 9 wherein said coating is formed of polytetrafluoroethylene.

* * * * *